(No Model.) 3 Sheets—Sheet 1.

M. F. MYERS.
PLANTER.

No. 360,815. Patented Apr. 5, 1887.

WITNESSES:
Aneas Nida
C. Sedgwick

INVENTOR:
M. F. Myers
BY Munn & Co.
ATTORNEYS.

(No Model.)　　　　　　M. F. MYERS.　　　3 Sheets—Sheet 2.
PLANTER.

No. 360,815.　　　　　　　　Patented Apr. 5, 1887.

WITNESSES:　　　　　　　　　　　　　INVENTOR:
　　　　　　　　　　　　　　　　　　　　　M. F. Myers
　　　　　　　　　　　　　　　BY　Munn & Co.
　　　　　　　　　　　　　　　　　　　ATTORNEYS.

(No Model.) 3 Sheets—Sheet 3.

M. F. MYERS.
PLANTER.

No. 360,815. Patented Apr. 5, 1887.

WITNESSES:

INVENTOR:
M. F. Myers
BY Munn & Co
ATTORNEYS.

UNITED STATES PATENT OFFICE.

MILLARD F. MYERS, OF GREENVILLE, OHIO.

PLANTER.

SPECIFICATION forming part of Letters Patent No. 360,815, dated April 5, 1887.

Application filed December 23, 1886. Serial No. 222,361. (No model.)

*To all whom it may concern:*

Be it known that I, MILLARD F. MYERS, of Greenville, in the county of Darke and State of Ohio, have invented a new and Improved Planter, of which the following is a full, clear, and exact description.

The invention relates to that class of agricultural implements commonly called "planters," the object of the present invention being to so construct the several parts of the machine that two rows may be planted at the same time, or a single row may be planted, or the device may be employed as a check-row planter, the main object of the invention being to provide a machine that shall be particulary adapted for use in the planting of potatoes, although the machine may be used in the planting of any other form of seed.

Reference is to be had to the accompanying drawings, forming part of this specification, in which similar figures of reference indicate corresponding parts in all the views.

Figure 1:
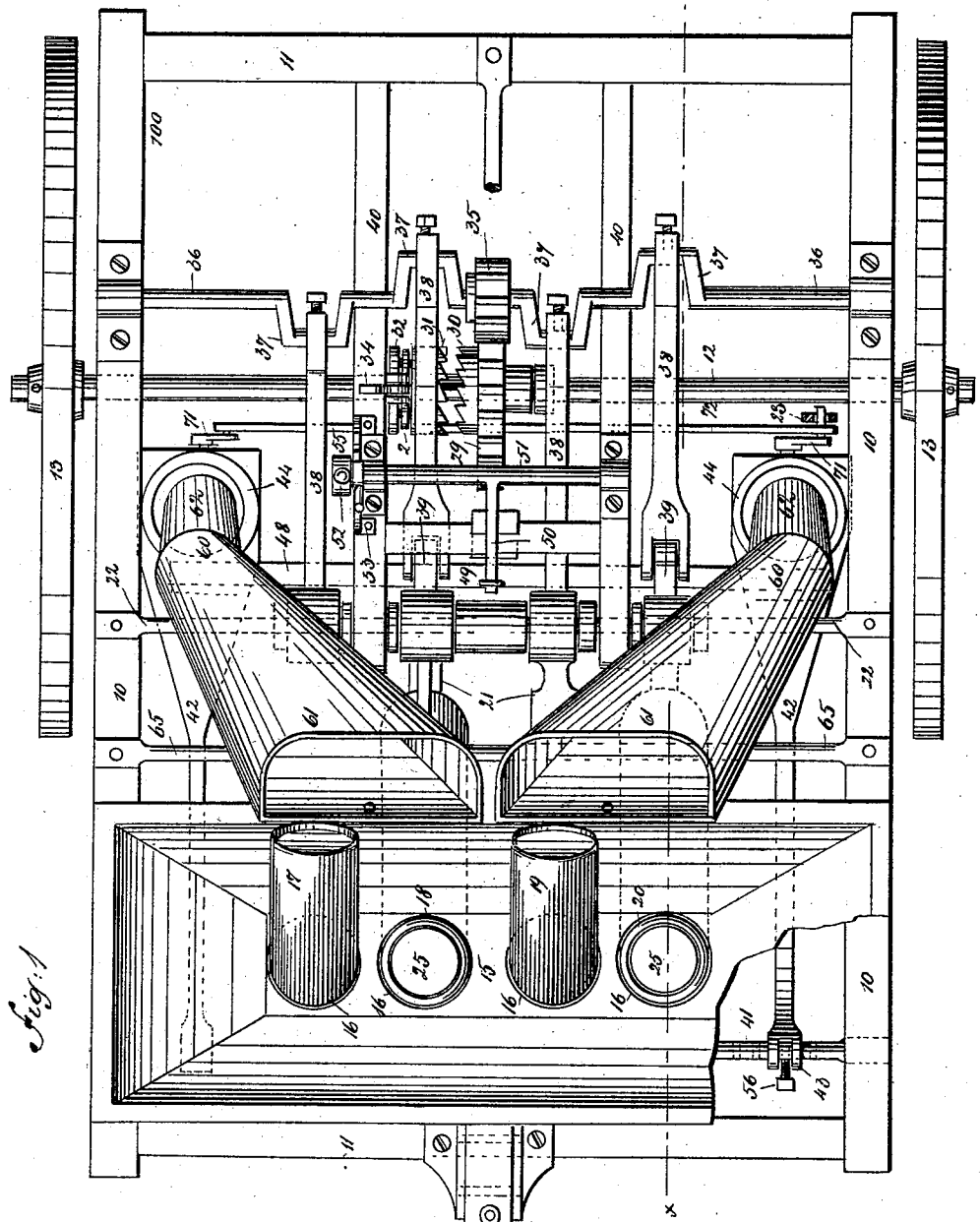
Figure 2:
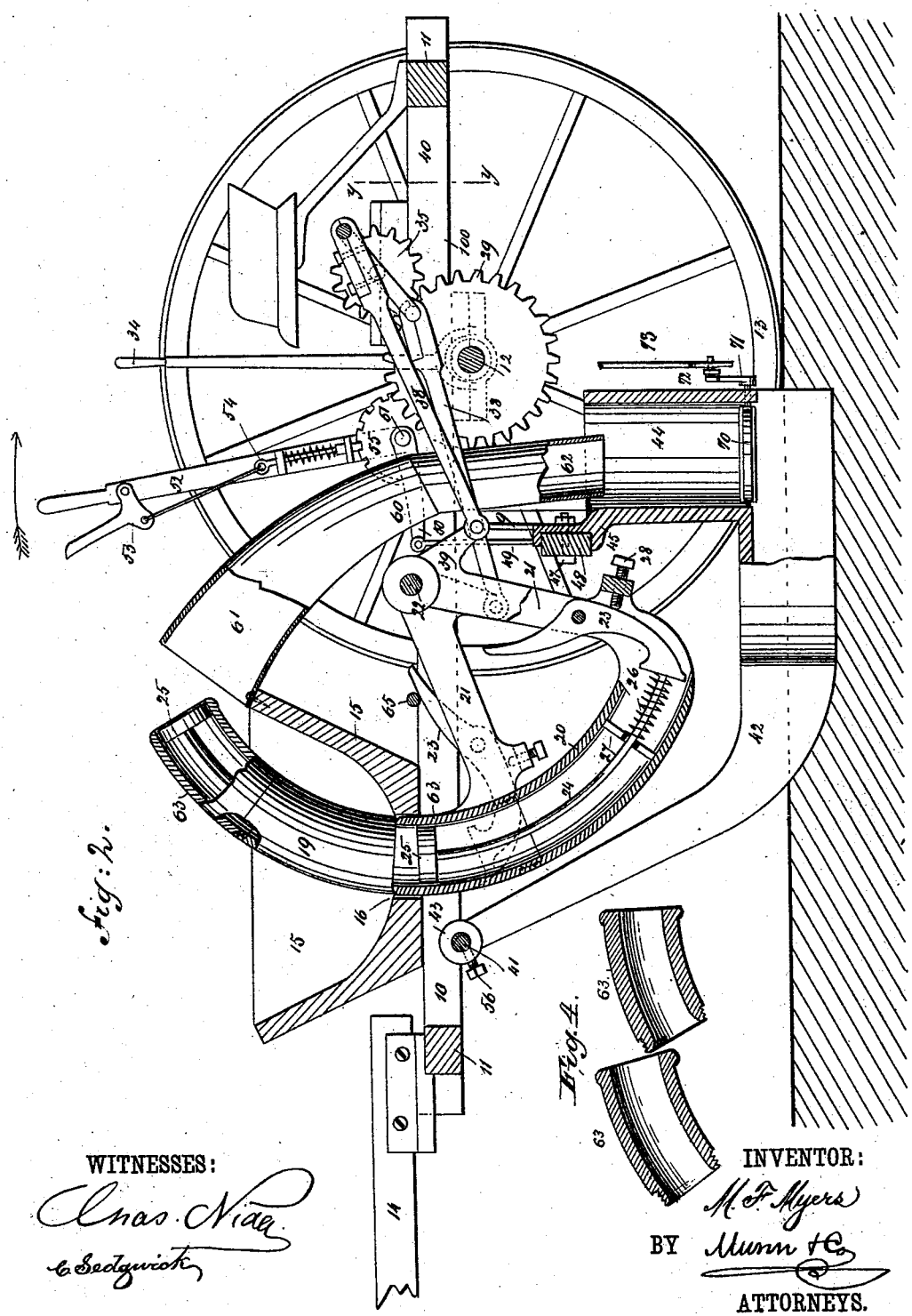
Figure 3:
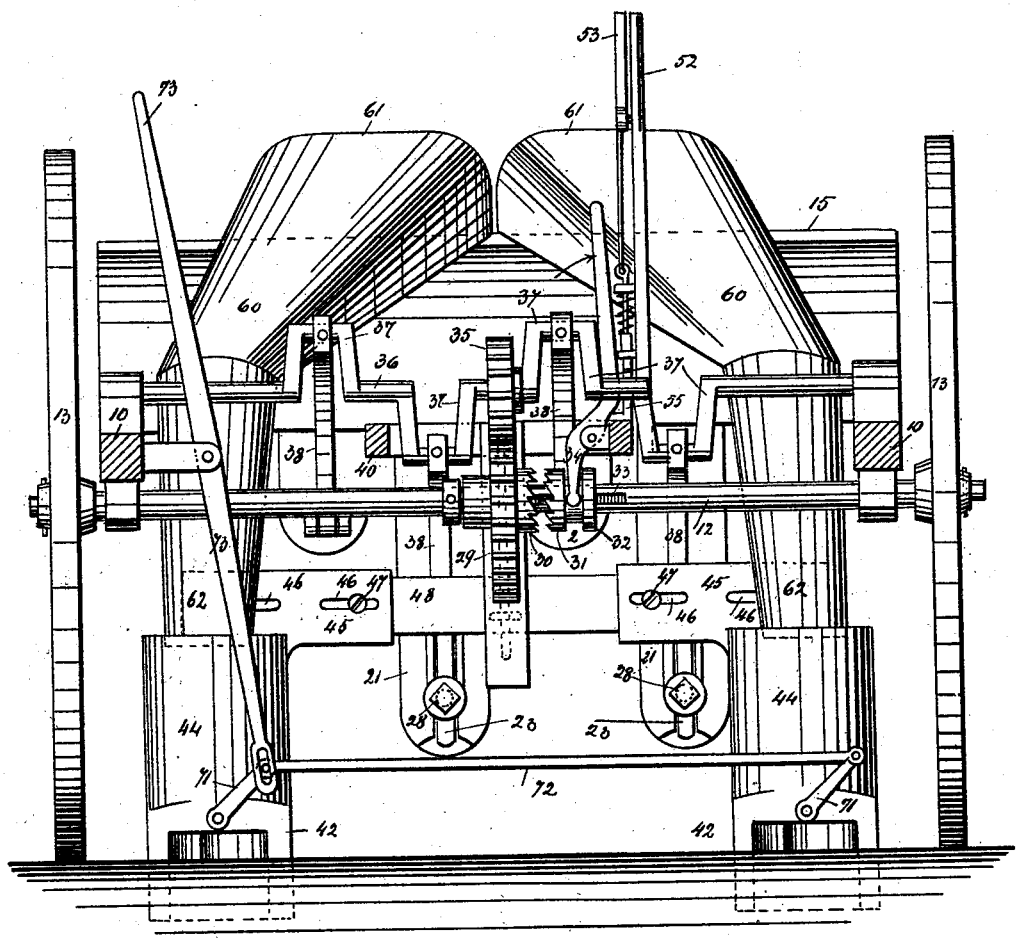

Figure 1 is a plan view of my improved form of planter, the seat being removed and the check-row lever being shown in section. Fig. 2 is a longitudinal sectional elevation, taken on line *x x* of Fig. 1, a portion of one of the feeders being broken away to disclose the arrangement of the interior parts; and Fig. 3 is a cross-sectional view of the machine, the view being taken upon a line corresponding with that of the line *y y* in Fig. 2, the seat in this view being, however, removed. Fig. 4 represents a curved tube and two ends therefor having bores of different diameter.

In constructing such a planter as the one illustrated in the drawings above referred to, I provide a main supporting-frame, 100, which consists of longitudinal side pieces, 10, and forward and rear cross-pieces 11. This frame 100 is mounted upon a transverse shaft or axle, 12, to which the wheels 13 are rigidly connected.

A pole or tongue, 14, is connected to the forward cross-timber 11 in any of the usual well-known ways, and just to the rear of the forward cross-piece 11 there is mounted a seed box or hopper, 15, which said seed box or hopper is formed with inwardly-inclined curved ends and sides, as clearly shown in Figs. 1 and 2.

In the bottom of the seed box or hopper 15 there are four apertures, 16, through which the upper ends of the feeders 17, 18, 19, and 20 pass, (these feeders are preferably made from tubes that are bent to the approximate form of a quadrant,) and to the rear end of each of the feeders I rigidly connect an upwardly-extending arm, 21, the upper end of each of said arms being apertured in order to provide for the passage of a transverse supporting-rod, 22, said rod being secured to the side timbers, 10, of the frame 100.

The arms 21 are each longitudinally slotted, and in the slots so formed there are mounted levers 23, to the lower arms of which there are connected curved rods 24, which rods extend upward through the tubes from which the feeders are formed, and carry at their upper ends pistons or plungers 25.

The rods 24 are normally held in the position in which the rod is shown in connection with the tube 20 in Fig. 2, this position being maintained through the medium of a spiral spring, 26, that is coiled about the lower end of the rod, one end of the spring abutting against the lever 23, while the other abuts against a centrally-apertured partition, 27, that is fixed to place within the tube. This position of the rod and its plunger may, however, be adjusted to suit the requirements of the case, said adjustment being obtained by means of a set-screw, 28, that is arranged to bear against the rear face of the lever, so that said lever may be adjusted to the required position.

Upon the shaft 12 I loosely mount a gear, 29, which is formed with a clutch-section, 30, the other clutch-section, 31, being formed upon a sleeve, 32, that is mounted upon a feather, 33, carried by the shaft 12, said sleeve 32 being formed with an annular groove, 2, within which the lower bifurcated end of a lever, 34, rides, said lever 34 being connected to one of the longitudinal timbers of an auxiliary frame, 40, that extends forward from the rear cross bar or timber 11.

The gear 29 engages with a small gear, 35, that is carried by a shaft, 36, said shaft 36 being formed with four cranks, 37, as clearly shown in the drawings. In connection with each of the cranks 37 I arrange a pitman, as 38, and these pitmen extend forward to engage with spurs 39, which extend to the rear from the arms 21.

Across the forward portion of the frame 100 I mount a transverse rod, 41, which rod serves as the support for the furrow-openers 42, the forward upper end of each of said openers being formed with an eye, 43, through which the rod 41 passes.

Above the rear end of the furrow-openers I arrange an upwardly-extending receiving tube, 44, said tubes being each provided with brackets 45, that are preferably formed with horizontal slots 46, through which slots there are passed clamping-screws 47, by means of which the tubes are held to a cross-bar, 48, and this cross-bar 48 is, by means of a connecting-rod, 49, connected to the forwardly-extending arm 50 of a shaft, 51, that is mounted upon the frame 40, as probably best shown in Fig. 1. To the right-hand end of this shaft 51, I connect a lever, 52, which extends upward to within reach of the driver, and to this lever I connect a hand-piece, 53, by means of which a bolt, 54, that engages with notches formed in a segmental rack, 55, is operated, the arrangement being such that by throwing the lever 52 in the direction of the arrow (shown in connection therewith in Fig. 2) the furrow-openers will be raised so that they will clear the ground.

In order that the furrow-openers may be adjusted to vary the space between the furrows, I split each of the eyes 43 and provide the rod 41 with a series of apertures at each end, the arrangement being such that after the furrow-openers have been moved to such position as may be required they may be locked to place by bringing a set-screw, 56, into engagement with a proper aperture in the rod 41, said screws at this time passing between the two sections of the eye in connection with which they are arranged, the rear end of each of the furrow-openers being adjusted through the medium of the screws 47 and elongated slots 46, as will be readily understood.

To the rear upper edge of the hopper 15 I pivotally connect two delivery-tubes, 60, said tubes being formed with flaring mouth-pieces 61 and with lower extensions, 62, which fit within the open upper ends of the tubes 44. These delivery-tubes 60 are pivotally connected to the hopper 15, in order that they may swing upon their connection with the hopper as the furrow-openers are adjusted toward or from the longitudinal center of the machine.

In order that the feeders 17, 18, 19, and 20 may be adjusted to feed the requisite amount of any particular kind of seed, I provide each of said feeders with an upper section, 63, said sections 63 being threaded to engage with the internally-threaded upper end of the main portion of the feeder in connection with which they are employed, and by varying the bore of these upper sections, 63, and providing pistons or plungers 25, that will properly fit within said bores, I am enabled to vary the amount of seed delivered at each throw of the feeders, which amount of seed may also be varied by turning the set-screws 28, so as to advance the plungers toward the upper ends of the sections 63, or so as to allow the springs 26 to hold the plungers at a greater distance from the upper ends of the sections 63.

Just to the rear of the hopper 15, I mount a cross-rod, 65, which cross-rod is arranged so as to extend across the line of travel of the upper arms of the levers 23.

Such being the general construction of my improved form of planter, the operation is as follows: The feeders having been adjusted so as to deliver a proper amount of seed at each throw, the machine is started forward, the lever 34 being moved in the direction of the arrow shown in Fig. 3, so as to cause the clutch-section 31, that is carried by the sleeve 32, to engage with the clutch-section 30 of the gear 29, after which, as the machine advances, the rotary motion of the shaft or axle 12 will be imparted to the crank-shaft 36, and as said crank-shaft revolves the arms 21 will be reciprocated and the feeders caused to travel upward and downward between the positions in which the two feeders 19 and 20 are shown in Fig. 2. When the feeders are in their lowest position their upper ends will be slightly below the bottom of the hopper, so that a portion of the seed that is within the hopper will fall within the upper end of the tube to be carried upward by the feeders. As the feeders approach their full upper stroke the upper arms of the levers 23 will strike the cross bar or rod 65, and the levers will be thereby thrown so that the plungers 25 will be forced upward to the position in which the plunger is shown in connection with the feeder 19 in Fig. 2, so that all seed carried by the feeders will be forced outward and into the flaring mouths 61 of the delivery-tubes 60, passing thence downward through said delivery-tubes and through the tubes 44 to the furrow that has been opened by the furrow-openers 42. The cranks 37 are so arranged that the feeders 17 and 19 are moving upward while the feeders 18 and 20 are moving downward, and vice versa, from which arrangement it will be seen that each of the delivery-tubes receives its charge at the same time.

In case it is desired to use the planter as a check-row planter, I arrange a pivotally-mounted trap, 70, within each of the tubes 44, and to the shafts of these traps I secure lever-arms 71, that are connected by a rod, 72, one of the lever-arms 71 being connected to a lever, 73, that is mounted upon the frame 100. By reciprocating this lever 73 the tubes 44 will be opened and discharged of their loads at the same time.

Although I have described my invention as arranged to plant two rows at a time, it will of course be understood that the machine might be halved and used to plant a single row.

Having thus fully described my invention,

I claim as new and desire to secure by Letters Patent—

1. The combination, with the frame, the crank-shaft, and the hopper 15, having an aperture, 16, in its bottom, of the transverse rod 22, the arm 21, mounted thereon at its rear end and rocked from the crank-shaft, the curved tube 20, secured to the forward end of the arm 21, the curved plunger-rod 24, having the plunger 25, normally resting just below the mouth of the tube and bottom of the hopper, the lever 23, pivoted to the arm 21, for operating the rod 24, and the stop secured to the frame in the path of the lever 23, substantially as set forth.

2. The combination, with the frame, the crank-shaft, the hopper 15, having openings 16 in its bottom, and the two delivery-tubes secured to the hopper with their mouths at the rear upper edge thereof, of the rod 22, the two pairs of arms 21, the arms of each pair being alternately thrown by suitable connections with the crank-shaft, the curved tubes 17 18 19 20, secured to the said arms, the levers 23, pivoted to the arms in rear of the tubes and having the curved rods 24, having pistons 25, springs 26, and the rod 65, two tubes delivering alternately into each delivery-tube, substantially as set forth.

3. In a planter, the curved tube 20, having an operating-arm, 21, the lever 23, having the curved rod 24, provided with the piston 25, resting normally below the mouth of the tube, and the set-screw 28, for adjusting the lever 23 and the piston operated thereby, substantially as set forth.

4. In a planter, the curved tube 20, having removable and interchangeable ends of varying bore, substantially as set forth.

5. In a planter, the combination, with a crank-shaft and hopper, of feeders provided with detachable ends, plungers arranged within the feeders, a means for actuating the plungers, and connections between the feeders and the crank-shaft, substantially as described.

6. In a planter, the combination, with a crank-shaft and hopper, of feeders, plungers arranged within the feeders, a means for operating the plungers, connections between the crank-shaft and the feeders, laterally-adjustable furrow-openers pivotally connected to the main frame of the planter, and delivery-tubes pivotally connected to the hopper at the upper ends to allow their lower ends to be adjusted toward or from each other to vary the distance between the drills, substantially as described.

7. In a planter, the combination, with a main shaft, of a gear loosely mounted thereon, a clutch and a clutch-operating mechanism, a crank-shaft carrying a pinion that is engaged by the gear of the main shaft, pivotally-mounted feeders, connections between the feeders and the crank-shaft, plungers mounted within the feeders, springs and levers arranged in connection with the plungers, and a stop arranged in connection with the levers, substantially as described.

MILLARD F. MYERS.

Witnesses:
 JOSEPH HOLLEHAN,
 JAMES K. RIFFEL.